US012759178B2

(12) United States Patent
Steiner et al.

(10) Patent No.: US 12,759,178 B2
(45) Date of Patent: Oct. 13, 2026

(54) STAMPING MACHINE FOR STAMPING LABELS AND COVERS

(71) Applicant: Berhalter AG, Widnau (CH)

(72) Inventors: Markus Steiner, Rebstein (CH); Mathias Schön, Salez (CH); Claudia Visentin, Buchs (CH); Jürg Thurnherr, Widnau (CH)

(73) Assignee: Berhalter AG, Widnau (CH)

( * ) Notice: Subject to any disclaimer, the term of this patent is extended or adjusted under 35 U.S.C. 154(b) by 784 days.

(21) Appl. No.: 17/641,860

(22) PCT Filed: Sep. 10, 2020

(86) PCT No.: PCT/EP2020/075293
§ 371 (c)(1),
(2) Date: Mar. 10, 2022

(87) PCT Pub. No.: WO2021/048259
PCT Pub. Date: Mar. 18, 2021

(65) Prior Publication Data

US 2022/0324130 A1 Oct. 13, 2022

(30) Foreign Application Priority Data

Sep. 10, 2019 (CH) .................................... 01140/19

(51) Int. Cl.
*B26D 5/08* (2006.01)
*B26D 7/18* (2006.01)
*B26F 1/40* (2006.01)

(52) U.S. Cl.
CPC ............... *B26D 5/086* (2013.01); *B26D 7/18* (2013.01); *B26F 1/40* (2013.01)

(58) Field of Classification Search
CPC ... B26D 7/18; B26D 5/00; B26D 7/00; B26D 7/025; B26D 7/32; B26F 1/40; B26F 1/38; B26F 1/44; B21D 28/002; B65H 20/02
See application file for complete search history.

(56) References Cited

U.S. PATENT DOCUMENTS 3,150,419 A * 9/1964 Aurich ..................... D01H 5/54 492/8
3,397,439 A * 8/1968 Heinz ................. F16C 32/0427 492/8
4,062,097 A * 12/1977 Riihinen .............. D21G 1/0213 492/8

(Continued)

FOREIGN PATENT DOCUMENTS

CH 712241 9/2017
CN 102699214 B * 5/2014

(Continued)

OTHER PUBLICATIONS

EP_1790470_A2 (Year: 2007).*

(Continued)

*Primary Examiner* — Jonathan G Riley
(74) *Attorney, Agent, or Firm* — Volpe Koenig

(57) ABSTRACT

A stamping machine for labels and covers includes a servomotor as a driving element. The servomotor can be directly or indirectly connected to a spindle which causes the stamp to move forward in a linear manner.

22 Claims, 5 Drawing Sheets

(56) References Cited

U.S. PATENT DOCUMENTS

| | | | | | |
|---|---|---|---|---|---|
| 4,158,456 | A * | 6/1979 | Holland-Letz | B65H 5/062 | 271/118 |
| 5,169,140 | A * | 12/1992 | Wenthe, Jr. | B65H 9/002 | 271/227 |
| 5,392,702 | A * | 2/1995 | Suzuki | D21G 1/0053 | 100/163 R |
| 9,486,992 | B2 * | 11/2016 | St. Ours | B65H 29/6618 | |
| 2001/0054787 | A1 * | 12/2001 | Yamagishi | B65H 5/062 | 271/3.17 |
| 2004/0065132 | A1 * | 4/2004 | Tschesche | B65H 5/062 | 72/248 |
| 2006/0104702 | A1 * | 5/2006 | Hawver | B65H 5/062 | 400/625 |
| 2006/0153622 | A1 * | 7/2006 | Bedzyk | B65H 5/06 | 400/625 |
| 2007/0000367 | A1 * | 1/2007 | Pfaff, Jr. | B26D 7/2628 | 83/698.11 |
| 2009/0013830 | A1 * | 1/2009 | Pfaff, Jr. | B23P 15/406 | 76/107.8 |
| 2016/0251177 | A1 * | 9/2016 | Nützel | B65H 29/70 | 271/272 |

FOREIGN PATENT DOCUMENTS

| | | | | |
|---|---|---|---|---|
| CN | 203864070 | | 10/2014 | |
| DE | 3304832 | A * | 9/1983 | |
| DE | 19536727 | C2 * | 1/1999 | B30B 1/103 |
| DE | 19948768 | | 3/2001 | |
| EP | 0021297 | A1 * | 1/1981 | F16C 13/024 |
| EP | 0525406 | | 2/1993 | |
| EP | 0947306 | A1 * | 3/1999 | B29C 51/26 |
| EP | 1790470 | A2 * | 5/2007 | B44B 5/00 |
| EP | 1790470 | | 6/2012 | |
| GB | 2176173 | A * | 12/1986 | B65H 5/062 |
| JP | 60188249 | A * | 9/1985 | |
| JP | S61127545 | | 6/1986 | |
| JP | S61127545 | A * | 6/1986 | |
| JP | H0323134 | | 1/1991 | |
| KR | 20120034709 | | 4/2012 | |
| KR | 20150073127 | A * | 6/2015 | |

OTHER PUBLICATIONS

KR_20150073127_A (Year: 2015).*
N_102699214_B (Year: 2014).*
DE_19536727_C2 (Year: 1999).*
EP_0947306_A1_ (Year: 1999).*
DE_3304832_A (Year: 1983).*
JP_60188249_A (Year: 1985).*
JP_S61127545_A (Year: 1986).*
EP_0021297_A1 (Year: 1981).*

* cited by examiner

Fig. 1
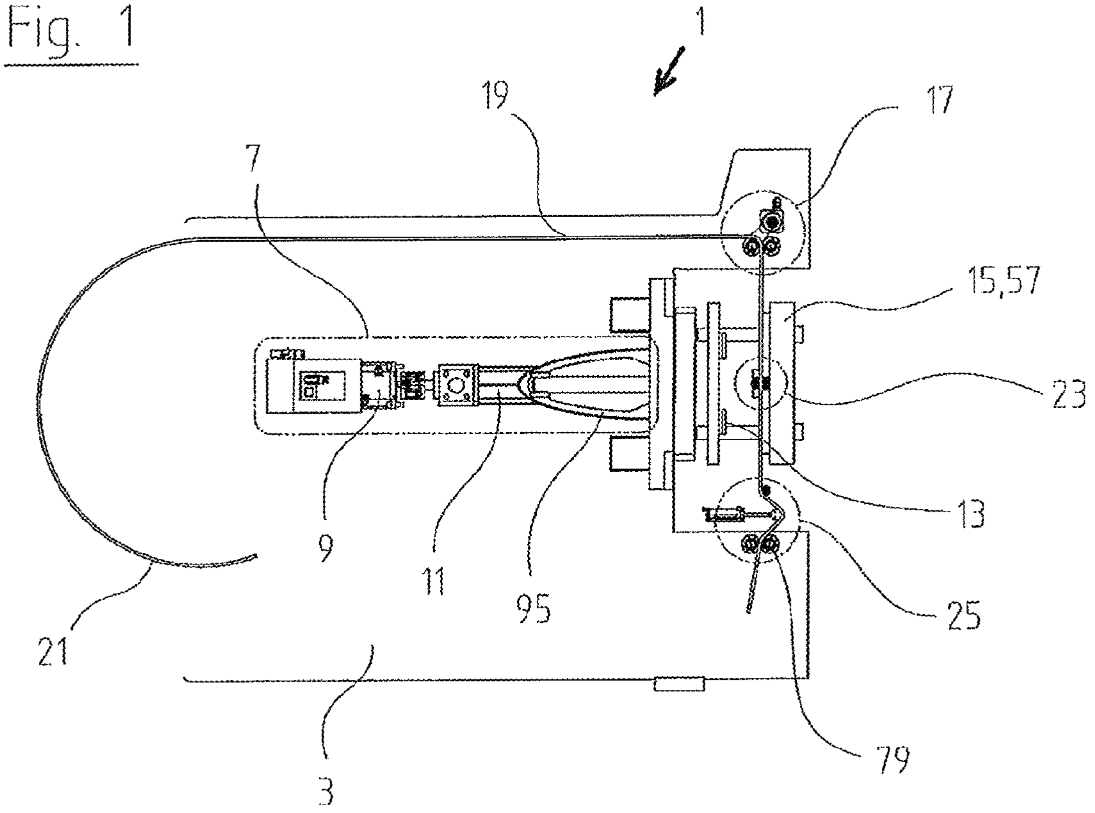
Fig. 2
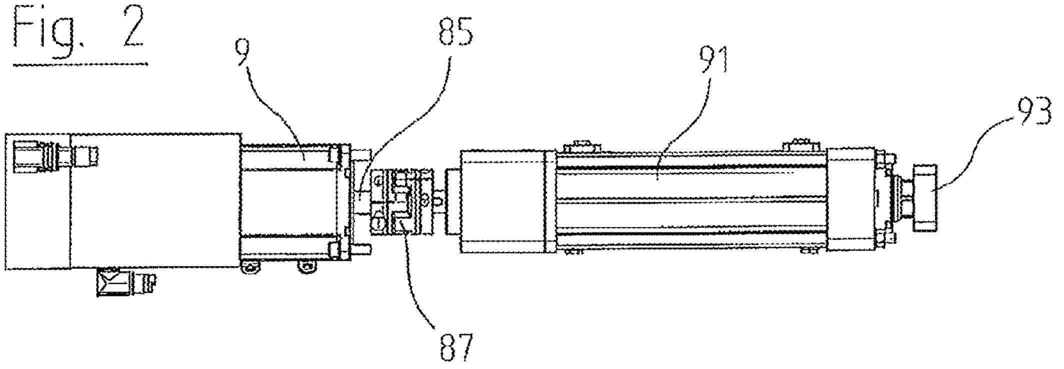
Fig. 4
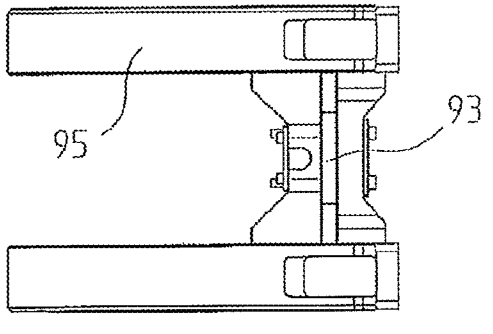
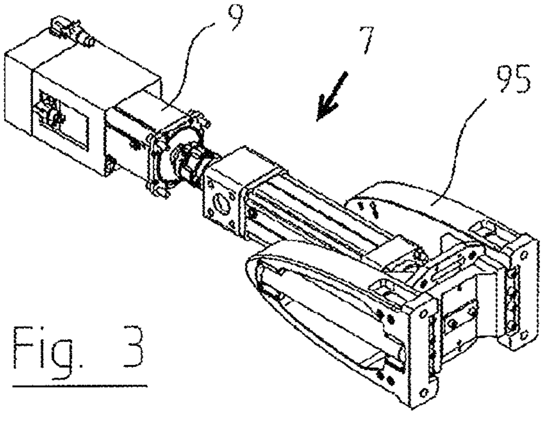
Fig. 3

Fig. 16
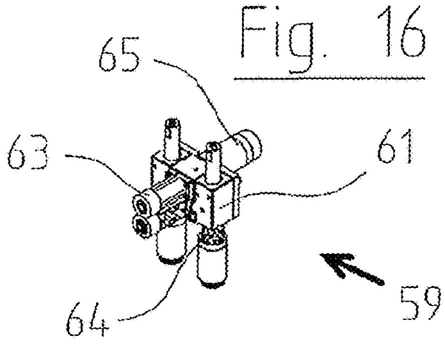
Fig. 17
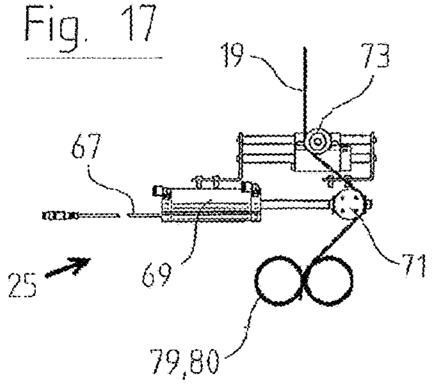
Fig. 18
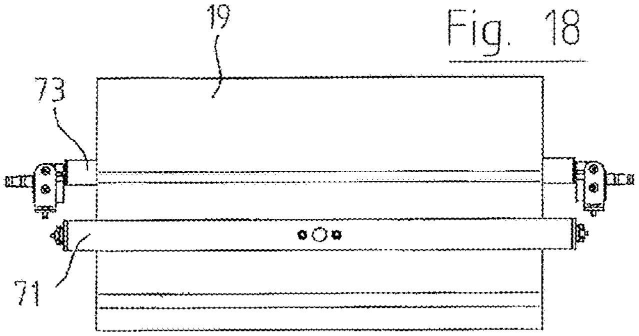
Fig. 20
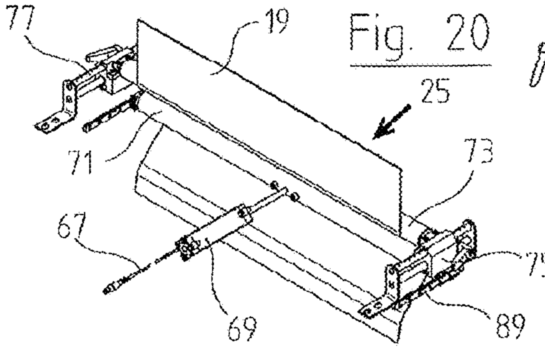
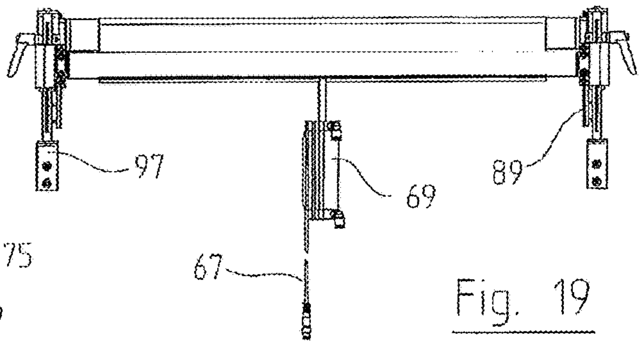
Fig. 19

STAMPING MACHINE FOR STAMPING LABELS AND COVERS

CROSS-REFERENCE TO RELATED APPLICATIONS

This application is the U.S. National Phase of PCT Appln. No. PCT/EP2020/075293, filed Sep. 10, 2020, which claims priority from Swiss Patent Application No. 01140/19, filed Sep. 10, 2019, the entire disclosures of which are incorporated by reference herein.

TECHNICAL FIELD

The subject of the invention is a stamping machine for stamping labels and covers. The subject of the invention is also a method for controlling the feed of the stamping punch.

BACKGROUND

The stamping of labels and flat covers is known and takes place in different ways. The labels and covers, which can be made from paper, cardboard, metal film, or from laminated materials such as metal and plastic materials, can, on the one hand, be produced using a stamping procedure with a linearly driven stamping punch or, on the other hand, between two rotating drums. The method described here comprises just stamping with a stamping punch against a die and in particular stamping labels and covers from a starting material supplied on an endless web.

In known stamping machines, the web material is unwound or taken off from a coil and passed between the stamping punch and the die. One or more labels are stamped out there simultaneously per stroke and after the stamping procedure the resulting stamped lattice of the supplied web is taken off and rolled up on a roll or sucked away and chopped up into small pieces.

Problems often occur in known stamping machines when feeding the material to be stamped in a stepwise fashion and taking off the stamped lattice and when the stamping punch is driven, and these can result in interruptions to production or faulty stamped products.

Problems result when feeding the material to be stamped, in particular one made from elastic materials such as plastic film, because the same tensions are not present in the edge zones of said elastic materials as at the center of the material to be stamped, which has the consequence that, when the material to be stamped (referred to below as the film for short) is transported, creases can occur. These different tensions at the edges and in the center of the film depend on the material used for the film and/or the width of the film and/or the shape and size of the stamped products, which means that, if possible at all, adjustments adapted to the properties of the film must be performed to one or more of the interacting elements of the stamping machine at the start of a new job, which take a lot of time and require well trained operators.

It is difficult to take off the stamped lattice because the film no longer has an intact surface and instead, because of the large number of stampings, has the shape of a lattice which can contract significantly when taken off transversely to the unwinding direction and has effects that extend as far as the stamping tool. Creases are primarily formed by high elastic strain in the edge regions and only low elastic strain in the middle of the complete piece of web material. The different strains cause constriction at the sides of the complete piece of web material and the associated formation of creases. The cause of the differences in strain between the edge and middle regions in the complete piece of web material is that the stamped lattice locally interrupts the flow of force with its holes and typically transmits almost all of the web tension to the edge regions. Because of the suction which is often used as a method of taking off the stamped lattice, the latter contracts particularly significantly, depending on the size and shape of the stamped-out cover. This can result in the formation of creases inside the stamping tool or in geometrically irregular stamped products. The stamped lattice can also collide with the stamping punch and/or other components when it is fed through the stamping tool. This results in interruptions in production which are undesired in terms of time and entails complicated manual intervention by operators. Both are cost-intensive and reduce the productivity and at the least also the quality of the stamped-out labels or covers.

It has also proved to be disadvantageous that in known stamping machines there is no flexibility possible in terms of the execution of the stamping stroke over time. The stamping tools, driven by a cam, can be altered with regard to the penetration depth solely by hand and only when the machine is at a standstill. This means that, when changing the material of the film or alternatively just the width of the film, the stamping machine always needs to be manually adapted to the new conditions.

The web of film is today usually guided in the tool with so-called web lifters. Such web lifters have many unfavorable properties:

- The stamping punches bang against the web lifters. This results in an impact with a considerable amount of noise being emitted at high cycle rates.
- Web lifters are spring-mounted and therefore have a tendency to oscillate and bounce.
- The web lifters guide the web in just one direction. Web lifters ensure a minimum spacing only between the web and the die but the spacing between the web and the stamping punch is not affected by the web lifters.
- Web lifters do not center the web in the opening gap of the tool.

Furthermore, it is difficult to access the tool region in known machines. Either access is blocked by mechanical structures or the distance by which the linear and main drive can open is limited. It is correspondingly complicated and uncomfortable to introduce the web material and clean the tool region. Poor access usually entails poor visibility of the tool region. Problems with the transporting of the web may therefore not be identified, or be identified only with difficulty. Conventionally constructed feed units do not achieve the required cycle rates or only pull the film at the edge region. Because the pressing force between the two rolls can only be imparted at their ends, to achieve uniform pressure on the film, either the rolls need to be designed to be extremely rigid or they need to have a thick rubber covering. The mass inertia of such rolls is high for the required web widths such that the commercially available servo drive systems are not powerful enough. Large servo drive systems do not resolve the problem because their own inertia increases the mass such that, from the outside, there is no resulting increase in performance.

SUMMARY

An object of the present invention is to provide a stamping machine which enables faultless uninterrupted stamping and in which in particular faultless feeding of the film to be stamped to and inside the stamping device is ensured and then faultless taking-off of the unstable stamped lattice is ensured. The intention is furthermore to provide the possibility of guiding the stamped lattice unobstructed through the stamping device and also out of it. A further object consists in being able to adjust and alter the time curve of the stamping stroke at any moment, in particular to adapt the time curve of the penetration into the film and extraction therefrom and the required stamping forces to the film to be processed. A further object of the invention is to provide a method by means of which the curve of the stamping stroke can be adapted to the properties of the film.

The object is achieved by the use of one or more of the features disclosed herein. Advantageous embodiments are described below and in the claims.

The use of a servo motor to directly drive the stamping punch instead of a cam drive not only makes it possible to be able to adjust the penetration depth of the stamping punch but in particular also the time curve of the penetration and retraction of the stamping punch and the duration for which the stamping punch remains in the penetration phase. A spindle connected to the servomotor or integrated therein makes it possible to implement extremely precisely in terms of time different feed rates and curves of the stamping stroke. The use of a servomotor and a spindle for the linear feed is low-maintenance. Precise positioning of the stamping punch can be ensured by virtue of the spindle being mounted on a tool carriage. The servomotor makes it possible to adjust as desired the time curve of the stamping punch when it moves from the rest position to the working position or the end thereof once it has penetrated and cut the film. In particular, a gentle approach and a high feed rate until it makes contact with the film can be produced and then, shortly before or when the stamping punch arrives at the surface of the film, according to the physical properties of the film, the speed profile can be modified in almost any desired fashion up until the end of the penetration of the punch into the die. A short pause, for example before penetration into the film, is also possible. A further considerable advantage of using a servomotor is that the penetration depth can also be modified and in particular the speed when contact is made with the film, independently of the thickness of the film. Compared with the prior art, where both the speed profile and the penetration depth are fixed, these parameters can be adjusted and altered according to the invention via a touch panel.

A tool carriage guided with no play and precisely and a moved tool part guided with no play and precisely are bolted rigidly to each other in the novel stamping machine. By virtue of the rigid connection of the two components, a guide system with a large spacing between the guides results which in practice permits no deformations and hence ensures a uniform cutting gap between the stamping punch and the die (a gap of 2-3 microns). The system of a tool carriage with a rigid connection between the tool carriage and the tool, and a free-floating tool, is unique and affords considerable advantages with respect to access to the tool region and a precise and stable guide system.

A slow start-up when the main drive of the machine is switched on is no longer necessary. The full working speed can be applied from the very first stamping cycle. Process fluctuations which vary because of the effects of speed are therefore virtually non-existent. The width of the feed unit can be adjusted to any size and the pressure on the web remains constant independently thereof because it does not depend on the rigidity of the drive rolls.

In the preferred embodiment, the feed device comprises two interacting rotatably driven rolls with a rubber jacket or a different high-friction coating. Magnets which are arranged axially spaced apart from one another are used in at least one of the shafts of the rolls which carry the jacket. They have the effect that the contact pressure between the two interacting rolls is constant over their whole length, i.e. between the bearing points, and the film can hence be supplied to the stamping device slip-free and at a precisely predetermined speed. Because the magnets are arranged so that they are stationary on the shaft and spaced apart from the axis of rotation, by rotating the shaft it is possible to alter and/or adjust the spacing from the opposite shaft or a ferromagnetic core arranged in the opposite shaft, and the attractive force and hence the surface pressure of the two rolls. Toothed wheels, over which a toothed belt, preferably a toothed belt with teeth attached to both sides, circulates, are fastened at the ends of the tubes which form the jackets. The two toothed wheels are simultaneously driven precisely at the same circumferential speed by virtue of them being partially encircled. This increases the accuracy of the feeding of the film and in particular distortion-free feeding over the whole width of the film.

The drivable pairs of conveyor rolls which are situated opposite each other in pairs on the base plate of the stamping device hold and convey the film inside the stamping device at all times transversely to the transporting direction and tensioned in the transporting direction. By virtue of these two pairs of rolls attached in pairs, the film, and the stamped lattice after the stamping stroke, are held at all times with the original width of the film, as a result of which the formation of wrinkles and at the least the catching of strips of the stamped film on parts of the stamping device can be avoided. In each case, two pairs of conveyor rolls can be rotatably mounted in a common axis or the pairs of conveyor rolls which are situated axially opposite each other are arranged at a slightly acute angle such that they pull and tension the film outward at all times during transport. The bearing housings of the conveyor rolls can be raised or lowered perpendicularly relative to the base plate in order to enlarge the distance of the film, and later the stamped lattice, from the die and from the punch and hence additionally to prevent it being possible for the stamped lattice to catch on the stamping device when it moves out of the stamping device. The linear guides with roller cages are preferably mounted so that they can be displaced vertically. By virtue of the pairs of conveyor rolls being arranged at the corners of a rectangle, the film and the stamped lattice always retain the original shape of the film which was supplied.

A first deflection roller is mounted so that it can be displaced essentially perpendicularly to the transporting direction, between a second pair of take-off rolls which are arranged downstream from the stamping device, viewed in the working direction, and can have the same design as the first pair of take-off rolls. The amount of the respective displacement caused by changes in tension or changes in the conveying speed is measured by a position sensor. The take-off speed can be regulated by the latter in order to guide the film and then the stamped lattice so that they are tensioned over their whole transport path. The deflection rollers over which the stamped lattice is guided after the stamping procedure are mounted in bearing blocks which can be mutually displaced on guide profiles in order to adapt the clamping gap to the thickness of the film or the stamped lattice.

BRIEF DESCRIPTION OF THE DRAWINGS

The invention is explained in detail below with the aid of an illustrated exemplary embodiment. In the drawings:

FIG. 1 shows a schematic side view of a stamping machine,

FIG. 2 shows a view from above of the main drive,

FIG. 3 shows a perspective view of the main drive,

FIG. 4 shows a view from above of the tool carriages for the stamping tool,

FIG. 16 shows a perspective view from below of the film drive, FIG. 17 shows a side view of the stamped lattice rocker, FIG. 18 shows a front view of the stamped lattice rocker in FIG. 17, FIG. 19 shows a view from above of the stamped lattice rocker, FIG. 20 shows a perspective view of the stamped lattice rocker.

DETAILED DESCRIPTION

Figure 6:
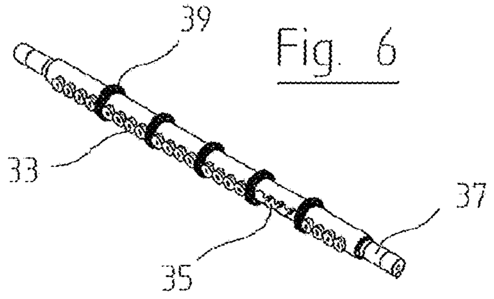
FIG. 6 shows the fixed shaft with bearings rings placed over it.
Figure 5:
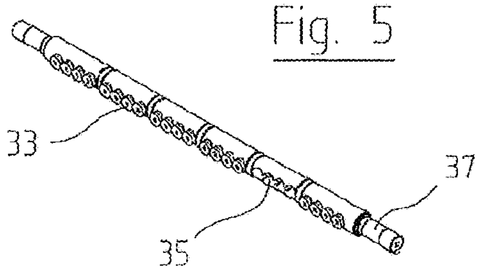
FIG. 5 shows a perspective view of a fixed shaft with magnets for the feed rolls.
Figure 8:
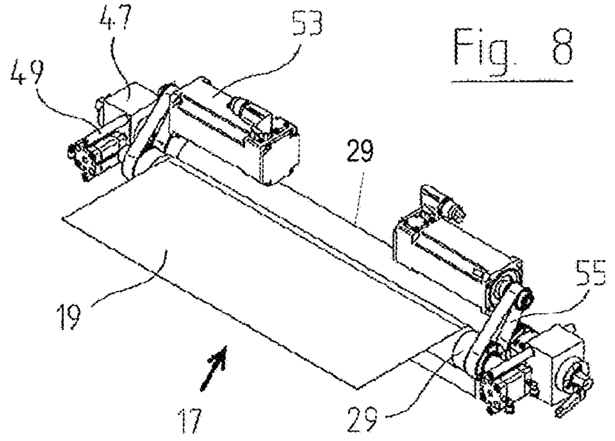
FIG. 8 shows the two rolls and the bearing block, additionally equipped with two drive motors, toothed drive belts, and shaft bearings.
Figure 7:
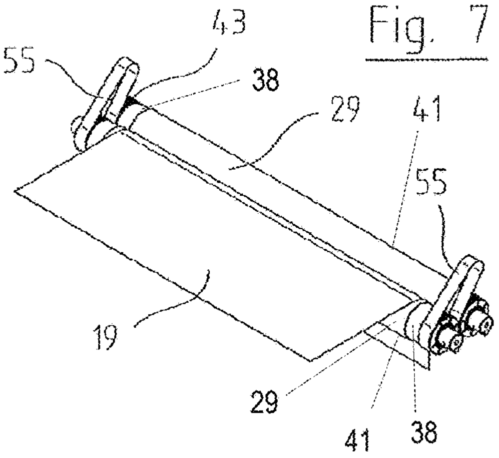
FIG. 7 shows two rolls, arranged on a bearing block, with a film guided between the rolls.
Figure 9:
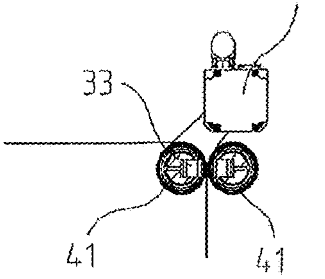
FIG. 9 shows a schematic side view of FIG. 7.

In the schematic side view of a stamping machine 1 for stamping labels and covers for containers, such as bottles, cans, tubs, and deep-drawn trays made from plastic or aluminum, the reference number 3 designates a side plate which is part of a machine frame. The essential elements of the stamping machine 1 comprise a main drive 7 with a servomotor 9, a spindle 11, a guide element such as a tool carriage which guides the stamping punch 13 linearly in the direction of a die 57 on a base plate 15, a feed unit 17 for a film 19 as stamping material in the form of a web which can be taken off from a coil 21 which serves as a web store, a stamped lattice drive 23 which is mounted in the stamping tool, and a dancer roll element in the form of a stamped lattice rocker 25.

The stamping material, referred to below as film 19 for short, is supplied to the stamping machine 1 from a coil 21. The film 19 is taken off from the coil 21 by the feed unit 17 which can be mounted upstream from a dancer roll (FIGS. 5 to 10).

Figure 10:
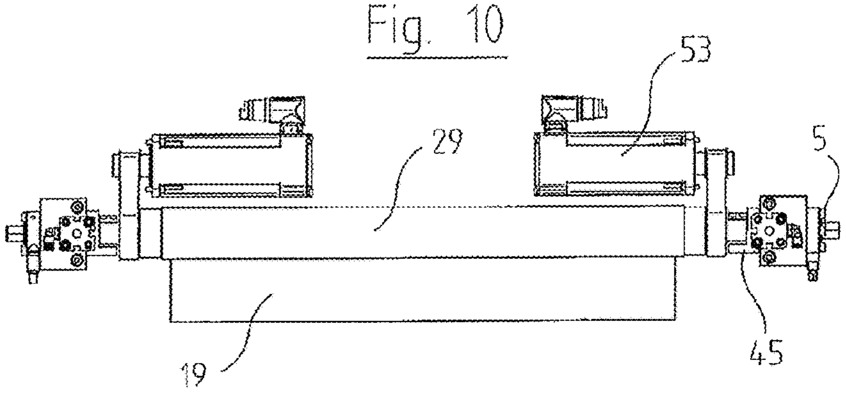
FIG. 10 shows a front view of FIG. 8.

The feed unit 17 comprises two rolls 29, arranged on axes which extend in parallel, which preferably have a rubber coating or jacket 41 on their periphery which ensures slip-free feeding of the film 19. At least one of the two rolls 29 can be driven by a drive motor 53. The two rolls 29 are preferably driven synchronously. The two rolls 29 comprise a shaft 37 on which a plurality of magnets 33, arranged axially parallel in a row, are arranged in bores 35 extending radially with respect to the axis. The magnets 33 can also be fastened on the surface of the shaft 37. The shaft 37 can have a round or rectangular cross-section. Bearing rings 39 are arranged rotatably on the shaft 37 between the magnets 33, distributed over the axial length of the shaft 37. The inner raceway of the bearing rings 39 is connected non-rotatably to the shaft 33. The outer bearing ring 39 carries a tube 38 which forms the rubber jacket. The shaft 37 forms the core for the tube 38 with the rubber jacket 41. Toothed wheels 43 are placed at the two ends of the shaft 37, connected non-rotatably to the tube 38 at the ends of the tube 38. Two such rolls 29 designed in this manner are carried at their ends by a bearing block 45 (FIG. 10).

First shaft bearings 47, rigidly connected to the bearing blocks 45, are arranged on the end faces of the bearing blocks 45. Two displaceable second shaft bearings, fastened to guide rods 49 on the first shaft bearings 47, carry the second roll 29.

The two rolls 29 are driven in opposite directions with toothed belts 55 by one or more drive motors 53. The toothed belt or both toothed belts 55 encircle the toothed wheels 43 at the two rolls 29. The toothed wheel or both toothed wheels 47 on the other roll 29 are driven synchronously by the outer teeth of the toothed belts 55, where, as illustrated schematically in FIG. 7, the toothed belts 55 have teeth on both sides.

In other words, the two rolls 29 can be driven precisely electronically synchronously with the same circumferential speeds. The rolls 29 which are thin in comparison with their axial length are attracted to each other by the shafts 37 which are arranged in their center and do not co-rotate with them or the electromagnets or permanent magnets 33 arranged thereon. In this way, a uniform mutual contact pressure of the peripheries of the rubber jacket 41 can be achieved over the whole axial length. This uniform mutual attractive force of the rolls 29 which extends over the whole axial length is maintained irrespective of the thickness of the film 19 which is guided and conveyed between the two rolls 29. The change in the axial spacing between the two rolls 29 because of films 19 of different thickness is compensated by displacement of one of the rolls 29 on the guides 49 on which the second shaft bearing is mounted so that it is radially displaceable.

The mutual attractive force can be adjusted. For this purpose, the shafts 37 are fastened on the bearing block 45 so that they can be rotated over a specified angle of rotation such that the radial spacing of the magnets 33 on the shafts 37 can be adjusted. The attractive force is highest when the magnets 33 on the two shafts 37 are situated precisely opposite each other between the axes of rotation of the rolls 29; if they are rotated by just a few angular degrees, the mutual attractive force decreases correspondingly.

In a simpler embodiment of the shafts 37, only one of the two shafts 37 is equipped with magnets 33. The second shaft 37 which is not equipped with magnets 33 is then produced from a ferromagnetic material. The angle of rotation of the shafts 37 can be altered by taking hold of the end face of the shafts 37.

Figure 11:
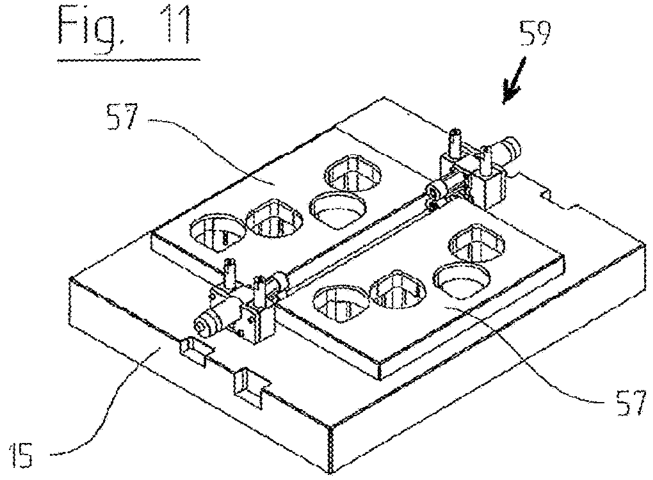
FIG. 11 shows a perspective view from above of the base plate with an inserted die and a film drive arranged on the base plate.
Figure 15:
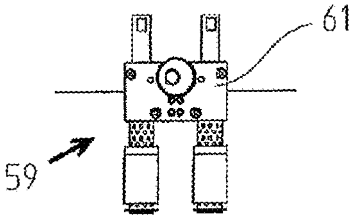
FIG. 15 shows a side view of the film drive.
Figure 12:
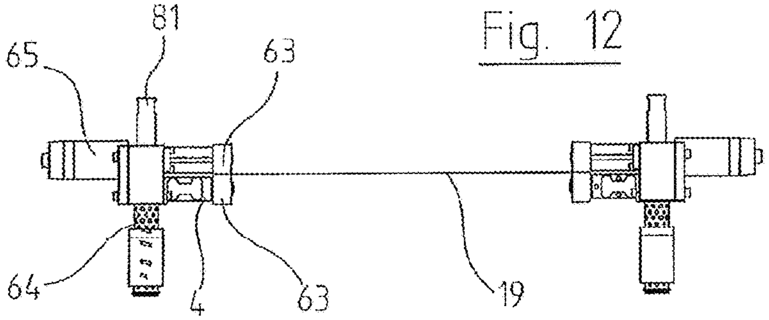
FIG. 12 shows a vertical section with a view from above of the stamped lattice drive with the conveyor rolls.
Figure 14:
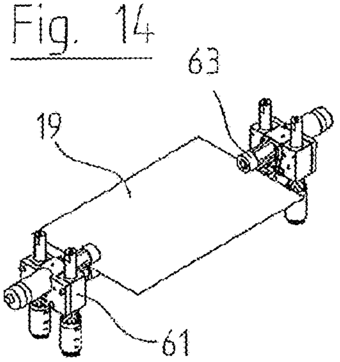
FIG. 14 shows a perspective view of the stamped lattice drive.
Figure 13:
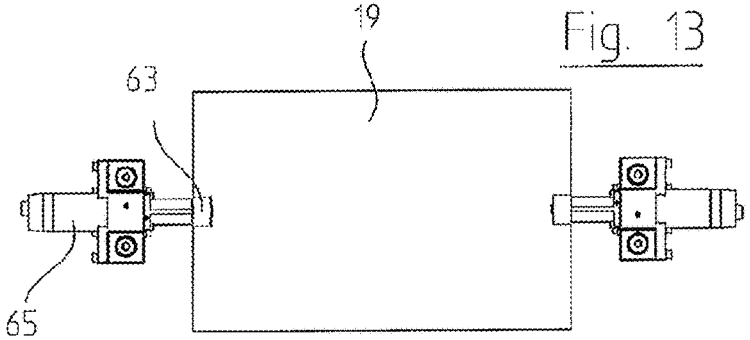
FIG. 13 shows a view from above of the stamped lattice drive.
Figure 22:
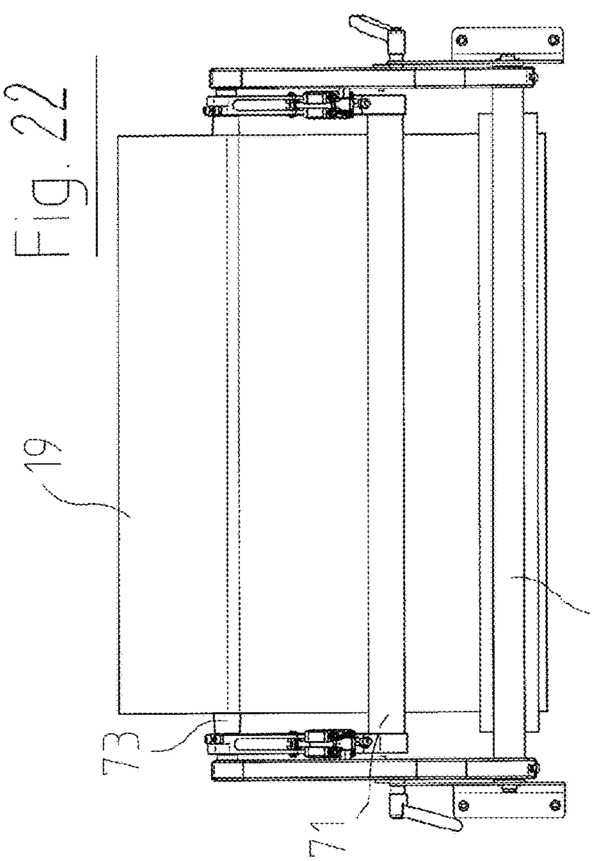
FIG. 22 shows a front view of the stamped lattice rocker in FIG. 21.
Figure 23:
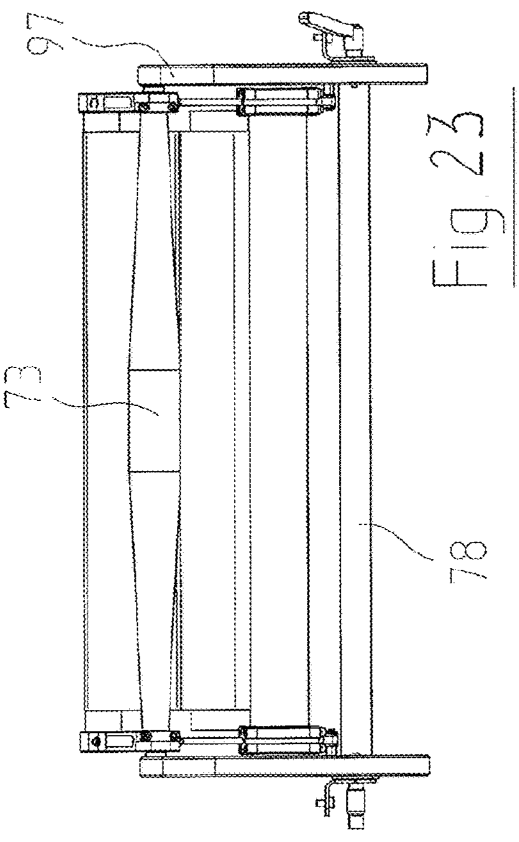
FIG. 23 shows a view from above of the stamped lattice rocker according to FIG. 21.
Figure 21:
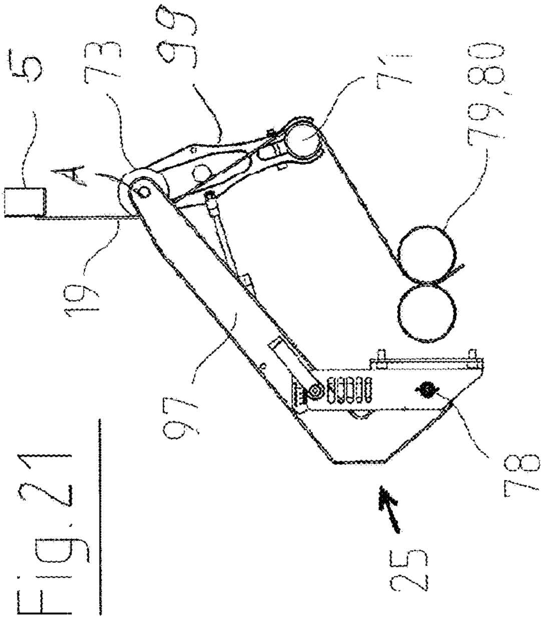
FIG. 21 shows a side view of a further stamped lattice rocker.
Figure 24:
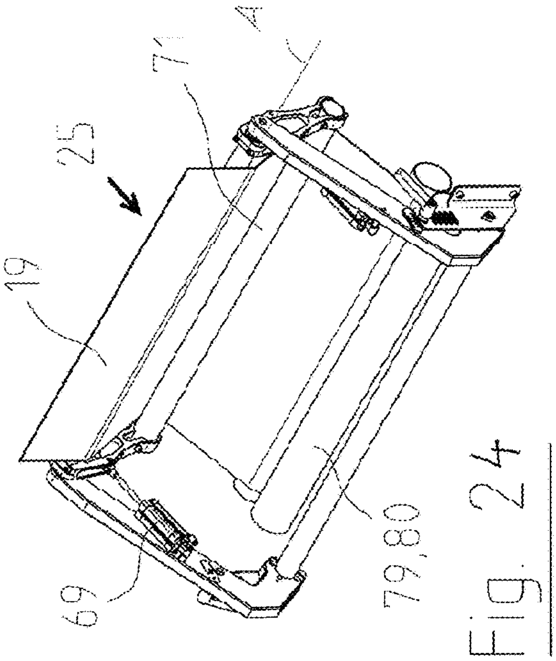
FIG. 24 shows a perspective view of the stamped lattice rocker obliquely from above.

The film 19 which is taken off from the coil 21 by the feed unit 17 then passes into the stamping device 5, i.e. between the stamping punch 13 and the base plate 15 with a die 57 (FIG. 11). Stamped lattice drives 59 between the stamping punch 13 and the die 57 for guiding the film 19 in the stamping device 5 comprise, outside the stamping device, in each case a bearing housing 61 inside which is a gearbox which has conveyor rolls 63 having parallel axes of rotation which project from the end faces of the housing 61 (FIGS. 12 to 15). It can furthermore be seen in FIG. 16 that the housing 61 is mounted so that it can be displaced vertically with the conveyor rolls 63 in a guide bore which is formed so that it is perpendicular in the base plate 15. The low-friction displaceability of the housing 61 and hence the film drive 59 is ensured by means of ball cages 64. One drive motor 65 is furthermore arranged in each case on the bearing housing 61.

As can also be seen in FIG. 11, the film drives 59 are arranged in pairs outside the periphery of the die 57, and to be precise in such a way that the conveyor rolls 63 can hold and then transport the web of film 19, clamped and tensioned, in the longitudinal edge region of the latter on the input side and output side during the stamping procedure in the base plate 15. The film 19 is consequently held by four pairs of conveyor rolls 63 during the stamping procedure, on the one hand, when the film 19 is stationary and, on the other hand, when it is being transported. It can consequently contract neither longitudinally nor transversely nor diagonally. The stamped lattice which results after the stamping is therefore also held, tensioned at all times, when the film 19 exits the stamping region. Even when the majority of the surface of the web of film 19 has been stamped out and only narrow strips remain which are no longer joined together in a stable fashion, the stamped lattice can be extracted from the stamping region without it being possible for the side edges of the former unstamped film 19 to contract and the strips which remain within the stamped lattice to remain stuck in the stamping device 5. The film drive 59 necessarily has a highly miniaturized design because it is situated between the base plate 15 with the die 57 and the stamping punch 13. The film drive 59 with its conveyor rolls 63 transports the film 19 between these elements in a stepwise fashion. In order to be able to maintain the tension at the edges of the film 19, in particular in the case of films 19 made from relatively elastic material, the axes of the conveyor rolls 63 can be adjusted slightly obliquely such that they can pull the film 19 constantly outward and hence hold the film 19 tensioned between the conveyor rolls 63 and appreciably minimize the formation of wrinkles or creases in the material. Interruptions in production can be largely prevented as a result.

By virtue of the vertically displaceable mounting and guidance of the film drives 59, enabled by the linear guides 81 which lead out from under the bearing housing 61 and are mounted so that they can be displaced axially in the base plate 15, the film drives 59 can be lifted off from the die 57 during the feeding of the film 19 in a vertical direction and, when the stamping device 5 closes, be returned toward the die 17 and brought into contact with it. This clearance of the film 19 during the feeding, between the underside of the film 19 and the surface of the die 57, further favors low-friction transporting of the film 19 when it is introduced into the stamping device 5 and, on the other hand, secure transporting of the stamped lattice away from the stamping device 5 during the feeding of the film 19.

The stamped lattice that is extracted from the stamping device 5 then passes over a second deflection roller 73 into the region of a stamped lattice rocker 25, generally also referred to as a dancer roll or dancer roll device (FIGS. 17 to 20). The stamped lattice rocker 25 of the first embodiment (FIGS. 17-20) comprises a first deflection roller 71 which can be displaced axially parallel by a pneumatic cylinder 69 or a spring element and is parallel to the second deflection roller 73. The ends of the first deflection roller 71 are mounted so that they can be displaced in parallel in bearing blocks 75 on horizontally arranged guide profiles 77. Arranged below the first deflection roller 71 is a pair of take-off rolls 79 with two interacting take-off rolls 80 with axes of rotation which extend parallel to the axes of rotation of the first 71 and second deflection roller 73. The rolls 80 of the pair of take-off rolls 79 can be driven by a drive which has not been illustrated. The structure of the pair of take-off rolls 79 can correspond to that of the feed unit 17 for taking the film 19 off from the coil 21.

The elements of the stamped lattice rocker 25 are arranged on a common modular rocker frame. The stamped lattice rocker 25 also comprises a position sensor 67 by means of which the position of the first deflection roller 71 is measured. The first deflection roller 71 and the second deflection roller 73, and the rollers 80 of the pair of take-off rolls 79, and the guide profiles 77 and the position sensor 67, are mounted on a frame which has not been illustrated and can be connected to the side plate 3 and/or the machine plinth which has not been illustrated.

A further particularly advantageous embodiment of the stamped lattice rocker 25 is illustrated in FIGS. 21-24. Two pivot arms 99 are articulated on one of two rocker side plates 97 which are arranged spaced apart from each other in parallel. The pivot arms 99 are pivotably fastened at one end to the side plates 97 of the rocker frame and can be adjusted in each case relative to the side plates 99 of the rocker side plates 97 by a spring element, for example a pneumatic cylinder, such that the angle between the side plates 97 can be adjusted with respect to a fastening plate of the rocker frame. Inserted between the ends of the pivot arms 99 which are situated opposite the pivot axis A is the first deflection roller 71 which guides the stamped lattice from the stamping device, following the second deflection roller 73, over the first deflection roller 71 and from there to the pair of take-off rolls 79. As in the first exemplary embodiment, the film 19 is consequently deflected between the pair of take-off rolls 99 and the second deflection roll 73 arranged above the latter such that faults caused by non-uniform tension in the film web in the supplying and taking-off of the film can be compensated by pivoting of the pivot arms 99 with the first deflection roller 71 fastened thereon.

The purpose of the stamped lattice rocker 25 is consequently that the stamped lattice is transported through the stamping device 5 in a stepwise fashion or continuously as parallel as possible to the pair of take-off rolls 79 which forms a second feed unit. The integrated positional monitoring by the position sensor 67 of the movable first deflection roller 71 serves to regulate the speed of the pair of take-off rolls 79. The regulation of the take-off speed ensures that, despite the distortion of the stamped lattice, either positively or negatively, the slippage in the feed units, position sensors of the feed units, or different roll diameters at the feed units (wear of the rubber) can be compensated and the film 19 or the stamped lattice is consequently guided, at all times tensioned and crease-free, at all times between the first feed unit 17 and the pair of take-off rolls 79.

The stamped lattice can be sucked away downstream from the pair of take-off rolls 79 but it can also be wound onto a sleeve for transporting away and disposal.

The main drive 7 illustrated in FIGS. 2 to 4 serves to stamp the film 19 in the stamping device 5, i.e. between the stamping punch 13 and the die on the base plate 15. The driven shaft 85 of the servomotor 9 can be connected to a spindle 11 (spindle only partially visible in FIG. 2) by means of a clutch 87 or directly. The spindle 11 is rotatably mounted in a spindle housing 91 and drives a fastening plate 93 for the stamping punch 13. The fastening plate 93 is guided in a tool carriage 95 in an axial direction with respect to the spindle 11. The force acting on the spindle 11 during the stamping stroke is transmitted from the spindle housing 91 to the side plate 3.

The servomotor 9 is connected to the machine control system (control system not illustrated). The stamping stroke parameters, namely the penetration depth, i.e. the maximum stroke of the punch and the minimum stroke of the punch and the acceleration or deceleration during the stamping stroke, and, if desired, reversing or stopping points situated between the end points of the stamping punch are generated by means of the control system. These options for varying the curve executed by the stamping punch 13 during the stamping stroke can be generated electronically and additionally adjusted and/or modified at any moment. It is consequently possible, without mechanical intervention in the machine when changing the thickness of the processed film 19, to make adaptations, on the one hand, to the materials from which the film 19 is made but also to its mechanical properties such as hardness or elasticity and to its respective thickness. For example, a relatively soft film 19 can first be compressed slightly and only then is the stamping procedure performed. Furthermore, the return stroke, i.e. the retraction of the punch 13, can also take place with a suitable variable speed and/or variable retraction curve.

The invention claimed is:

1. A stamping machine for stamping labels and covers for containers made from paper, cardboard, metal, or laminated materials manufactured therefrom from film supplied on a web, the stamping machine comprising:

- a feed unit configured to transport the film from a coil to a stamping tool, the coil being a web store for the film to be stamped, and the feed unit includes a drivable feed device configured to take the film as a film web from the web store and for feeding the film to a stamping device that includes the stamping tool;
- the drivable feed device includes two interacting rotatably driven rolls, the two interacting rotatably driven rolls each include a rubber jacket arranged on a tube, the tubes are each carried by a plurality of bearing rings, the bearing rings of each tube are fastened to a respective shaft such that the tubes are rotatably mounted on outer ones of the bearing rings for coaxial rotation about the respective shaft via the bearing rings, and a plurality of magnets are fastened on each shaft and arranged parallel to axes of the shafts, the plurality of magnets on each shaft attract the two interacting rotatably driven rolls toward each other over an axial length thereof by mutual attractive magnetic forces;
- the stamping tool including a stamping punch, a die on a base plate with guides for the stamping punch during stroke movements, and a drive member for generating the stroke movement of the stamping punch;
- a take-off device configured to take a stamped lattice off from the stamping device and for supplying the stamped lattice to a stamped lattice holder; and
- the drive member is configured to generate a linear movement of the stamping punch and comprises a servomotor with a spindle, and the spindle is connected to a tool carriage which carries and guides the stamping punch.

2. The stamping machine as claimed in claim 1, wherein the spindle is connected to the servomotor by a clutch.

3. The stamping machine as claimed in claim 1, wherein the spindle is directly connected to a shaft of the servomotor.

4. The stamping machine as claimed in claim 1, wherein the plurality of magnets are fastened spaced apart from the axes of the shafts, and each shaft is configured to be rotated and adjusted independently of the respective interacting rotatably driven roll about the axes of the shafts to adjust a mutual spacing, the mutual spacing being a distance between one said magnet of the plurality of magnets on one of said shafts and a corresponding one of the magnets of the plurality of magnets on another of said shafts.

5. The stamping machine as claimed in claim 4, further comprising,

- a first toothed wheel, which is at least partially encircled by a toothed belt, the first toothed wheel is fastened on an end of a first one of said interacting rotatably driven rolls, and the toothed belt is drivable by a drive motor such that during operation of the drive motor the toothed belt drives the first toothed wheel.

6. The stamping machine as claimed in claim 5, further comprising, a second toothed wheel fastened to an end of a second one of said interacting rotatably driven rolls, wherein the toothed belt has teeth on both sides and partially encircles the first and second toothed wheels such that during operation of the drive motor, the toothed belt drives the first and second toothed wheels simultaneously.

7. The stamping machine as claimed in claim 1, further comprising pairs of drivable conveyor rolls which are situated opposite each other in pairs arranged on the base plate of the die and are mounted to be floating in bearing housings arranged on the base plate.

8. The stamping machine as claimed in claim 7, wherein the bearing housings are mounted so that they can be raised and lowered perpendicularly to a surface of the base plate.

9. The stamping machine as claimed in claim 8, further comprising linear guides attached to the underside of the bearing housings and configured such that the bearing housings are displaceable vertically in bores in the base plate.

10. The stamping machine as claimed in claim 9, wherein the linear guides comprise roller cages.

11. The stamping machine as claimed in claim 10, axes of rotation of the pairs of conveyor rolls situated opposite each other extend coaxially and horizontally.

12. The stamping machine as claimed in claim 10, axes of rotation of the pairs of conveyor rolls situated opposite each other are arranged so that they extend at an acute angle to each other.

13. The stamping machine as claimed in claim 7, wherein there are two sets of, two pairs of the conveyor rolls, arranged in a rectangle, arranged on the base plate.

14. The stamping machine as claimed in claim 1, further comprising a stamped lattice rocker, which comprises a first deflection roller configured to deflect the incoming film as a dancer roll, inserted between the stamping device that includes the stamping tool and a pair of take-off rolls, and a second deflection roller arranged between the stamping device and the first deflection roller, and the first deflection roller is mounted to be displaceable parallel to an axis of rotation thereof.

15. The stamping machine as claimed in claim 14, wherein ends of the first deflection roller are mounted displaceably on guide rails or are movable axially parallel at ends of pivot arms on curved sections.

16. The stamping machine as claimed in claim 15, wherein the first deflection roller is held axially parallel and resiliently displaceable by at least one of spring elements, spring assemblies, or pneumatic cylinders.

17. The stamping machine as claimed in claim 16, wherein a position of the first deflection roller with respect to the take-off roller is measurable and adjustable by a position sensor.

18. The stamping machine as claimed in claim 17, wherein the first deflection roller is mounted at both ends in bearing blocks, and the bearing blocks are arranged on guide profiles to be displaceable in parallel.

19. The stamping machine as claimed in claim 17, wherein the pivot arms are pivotable by spring elements, spring assemblies, or pneumatic cylinders and are adjustably positionable.

20. A method for controlling the stamping stroke in the stamping machine as claimed in claim 1 for stamping labels and covers from a film for containers, the method comprising:

performing stroke movements with a stamping punch;

in a feed stroke, the stamping punch penetrating and cutting the film, and in a return stroke retracting the stamping punch to the starting position; and modifying the stroke movements in the feed and return strokes in terms of distance and time depending on a thickness and properties of the film being processed.

21. The stamping machine as claimed in claim 1, wherein the two interacting rotatably driven rolls are driven synchronously.

22. The stamping machine as claimed in claim 1, wherein inner raceways of the bearing rings are connected non-rotatably to the respective shafts and respective outer ones of the bearing rings carry the respective tubes.

* * * * *